(12) United States Patent
Haeffele et al.

(10) Patent No.: US 7,610,610 B2
(45) Date of Patent: *Oct. 27, 2009

(54) INTEGRATED FIREWALL, IPS, AND VIRUS SCANNER SYSTEM AND METHOD

(75) Inventors: Steven M. Haeffele, Los Gatos, CA (US); Ramesh M. Gupta, San Jose, CA (US); Ananth Raman, San Jose, CA (US); Srikant Vissamsetti, Fremont, CA (US)

(73) Assignee: McAfee, Inc., Santa Clara, CA (US)

( * ) Notice: Subject to any disclaimer, the term of this patent is extended or adjusted under 35 U.S.C. 154(b) by 791 days.

This patent is subject to a terminal disclaimer.

(21) Appl. No.: 11/033,426

(22) Filed: Jan. 10, 2005

(65) Prior Publication Data

US 2006/0156403 A1 Jul. 13, 2006

(51) Int. Cl.
*G06F 21/00* (2006.01)
*G06F 11/30* (2006.01)

(52) U.S. Cl. .............................. 726/1; 726/22
(58) Field of Classification Search .................. None
See application file for complete search history.

(56) References Cited

U.S. PATENT DOCUMENTS

| | | | | |
|---|---|---|---|---|
| 6,704,874 B1* | 3/2004 | Porras et al. | ................... | 726/22 |
| 6,711,686 B1* | 3/2004 | Barrett | ....................... | 709/221 |
| 6,826,697 B1* | 11/2004 | Moran | .......................... | 726/23 |
| 6,880,086 B2* | 4/2005 | Kidder et al. | ................ | 713/191 |
| 6,957,348 B1* | 10/2005 | Flowers et al. | ................. | 726/23 |
| 6,996,843 B1* | 2/2006 | Moran | .......................... | 726/23 |
| 7,032,114 B1* | 4/2006 | Moran | .......................... | 713/187 |
| 7,076,803 B2* | 7/2006 | Bruton et al. | .................. | 726/23 |
| 7,174,566 B2* | 2/2007 | Yadav | ........................... | 726/26 |
| 7,197,539 B1* | 3/2007 | Cooley | ....................... | 709/206 |
| 7,293,063 B1* | 11/2007 | Sobel | .......................... | 709/206 |
| 7,331,061 B1* | 2/2008 | Ramsey et al. | ................. | 726/23 |
| 7,389,539 B1* | 6/2008 | Kouznetsov | .................. | 726/22 |
| 2004/0168087 A1 | 8/2004 | Mendenhall et al. | ......... | 713/201 |
| 2004/0179477 A1 | 9/2004 | Lincoln et al. | ............... | 370/241 |

OTHER PUBLICATIONS

"Norton Internet Security User's Guide, Norton Internet Security 2002", 2001, Symanetc Corporation, p. 1-171.*
International Search Report from PCT/US2006/000634 mailed Jun. 7, 2006.
Intoto: "Virtual Firewalls White Paper", XP002385766, http://intoto.com/product_briefs/Virtual%20Firewalls%20White%20Paper.pdf.
Fengmin Gong: "Next Generation Intrusion Detection Systems (IDS)" McAfee White Paper, Nov. 2003, XP002385767, http://www.mcafee.com/us/local_content/white_papers/wp_intruvertnextgenerationids.pdf.
Symantec: "News Release: Symantec's Norton Internet Security 2004 Provides Comprehensive Protection Against Online Threats Including Spyware and Spam", Sep. 8, 2003, XP002385768, http://www.symantec.com/press/2003/n030908a.html.
Roelle, H: "A hot-failover state machine for gateway services and its application to a Linux firewall", XP002385770, ISBN: 3-540-00080-1, http://www.springerlink.com.
Final Office Action Summary from U.S. Appl. No. 11/852,932 mailed on Dec. 30, 2008.

* cited by examiner

*Primary Examiner*—Christopher A Revak
(74) *Attorney, Agent, or Firm*—Zilka-Kotab, PC

(57) ABSTRACT

A system, method and computer program product are provided including a router and a security sub-system coupled to the router. Such security sub-system includes a plurality of virtual firewalls, a plurality of virtual intrusion prevention systems (IPSs), and a plurality of virtual virus scanners. Further, each of the virtual firewalls, IPSs, and virus scanners is assigned to at least one of a plurality of user and is configured in a user-specific.

18 Claims, 16 Drawing Sheets

Category Name _____

[Add] [Edit] [Delete]

```
*espn*
www.sportsline.com
*sport*
www.yahoo.com/sports
*.nbc.com
etc...
``` ial user interface. Such graphical user interface may include a virtual firewall interface, a virtual IPS interface, a virtual virus scanner interface, etc.

In yet another embodiment, the security sub-system may reside in front of the router, in back of the router, and/or even take the form of a component of the router.

INTEGRATED FIREWALL, IPS, AND VIRUS SCANNER SYSTEM AND METHOD

FIELD OF THE INVENTION

The present invention relates to computer and network security, and more particularly to related security services.

BACKGROUND

In the space of just over a decade, the Internet, because it provides access to information, and the ability to publish information, in revolutionary ways, has emerged from relative obscurity to international prominence. Whereas, in general, an internet is a network of networks, the Internet is a global collection of interconnected local, mid-level, and wide-area networks that use the Internet Protocol (IP) as the network layer protocol. Whereas the Internet embraces many local- and wide-area networks, a given local- or wide-area network may or may not form part of the Internet.

As the Internet and its underlying technologies have become increasingly familiar, attention has become focused on Internet security and computer network security in general. With unprecedented access to information has also come unprecedented opportunities to gain unauthorized access to data, change data, destroy data, make unauthorized use of computer resources, interfere with the intended use of computer resources, etc. These opportunities have been exploited time and time again by many types of malware including, but is not limited to computer viruses, worms, Trojan horses, etc. As experience has shown, the frontier of cyberspace has its share of scofflaws, resulting in increased efforts to protect the data, resources, and reputations of those embracing intranets and the Internet.

To combat the potential risks associated with network usage, numerous security tools have been developed such as firewalls, intrusion prevention systems (IPSs), virus scanners, etc. To date, however, such tools are typically packaged for either individual or enterprise use. In the context of enterprise use, the foregoing tools are typically packaged for employment by large corporations, without the ability to tailor and/or select security policies on a group-by-group/user-by-user basis.

There is thus a need for overcoming these and/or other problems associated with the prior art.

SUMMARY

A system, method and computer program product are provided including a router and a security sub-system coupled to the router. Such security sub-system includes a plurality of virtual firewalls, a plurality of virtual intrusion prevention systems (IPSs), and a plurality of virtual virus scanners. Further, each of the virtual firewalls, IPSs, and virus scanners is assigned to at least one of a plurality of users and is configured in a user-specific manner.

In one embodiment, the security sub-system may further include a plurality of anti-spam modules, content filtering modules, uniform resource locator (URL) filtering modules, virtual private network (VPN) modules, spyware filtering modules, adware filtering modules, etc. Further, each of such modules may be assigned to at least one of the plurality of the users, and may be configured in the user-specific manner.

As a further option, the user-specific configuration may be provided utilizing a plurality of user-specific policies. Still yet, the user-specific policies may be selected by each user. Even still, the user-specific policies may be selected utilizing

DETAILED DESCRIPTION

Figure 1:
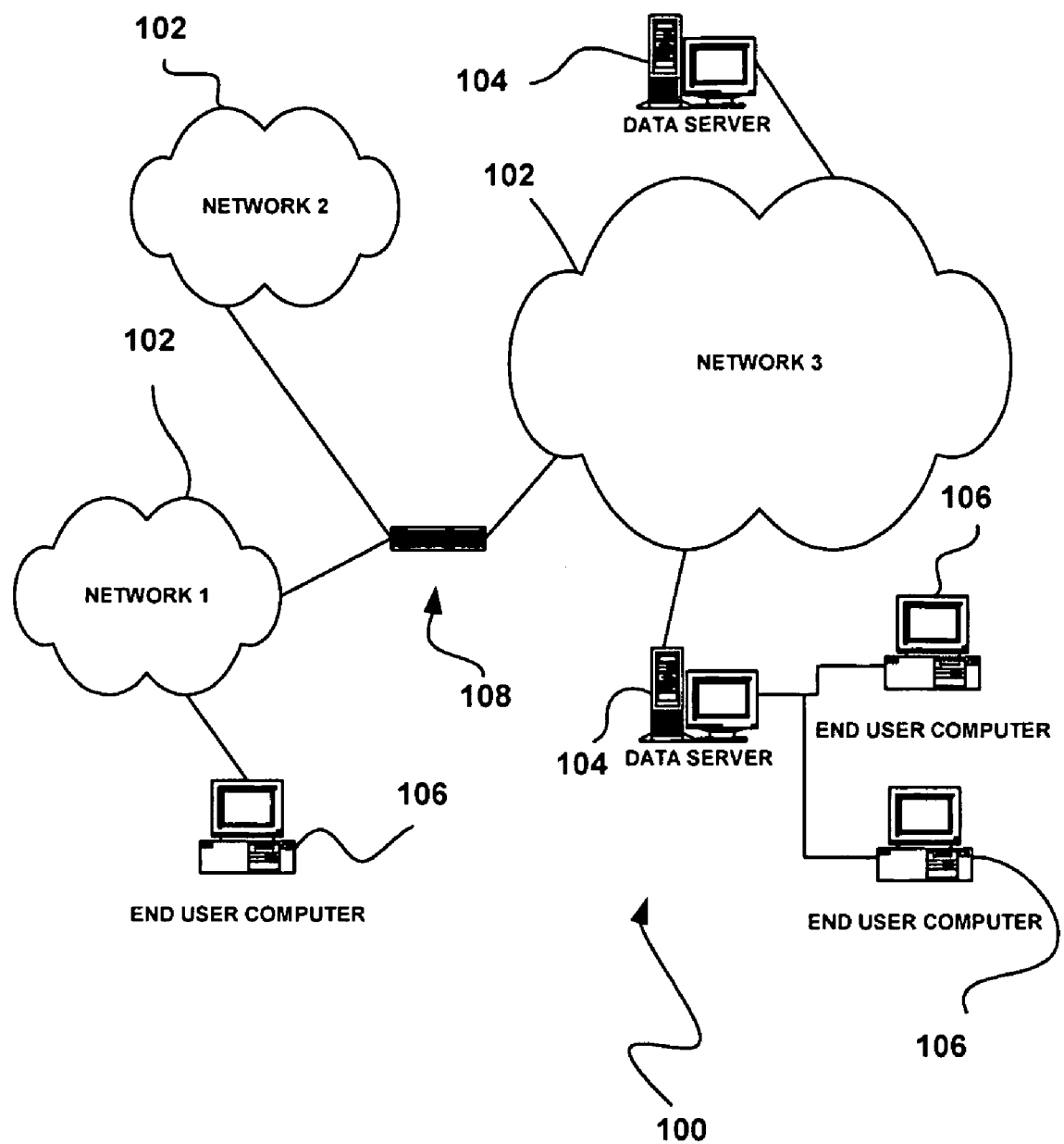
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wide area network (WAN) such as the Internet, etc.

Coupled to the networks 102 are data server computers 104 which are capable of communicating over the networks 102. Also coupled to the networks 102 and the data server computers 104 is a plurality of end user computers 106. In the context of the present description, such end user computers 106 may take the form of desktop computers, laptop computers, hand-held computers, cellular phones, personal data assistants (PDA's), and/or any other computing device.

In order to facilitate communication among the networks 102, at least one router 108 (which may take the form of any type of switch, in the context of the present description) is coupled therebetween. In use, such router 108 has a security system (i.e. sub-system, etc.) coupled thereto.

Such security system includes a plurality of virtual firewalls, a plurality of virtual intrusion prevention systems (IPSs), and a plurality of virtual virus scanners. Further, each of the virtual firewalls, IPSs, and virus scanners is assigned to at least one of a plurality of users and is configured in a user-specific manner.

Of course, such security system modules may be expanded in any desired, optional way. For example, the security system may further include a plurality of anti-spam modules, content filtering modules, uniform resource locator (URL) filtering modules, virtual private network (VPN) modules, spyware filtering modules, adware filtering modules, etc. Still yet, each of such modules may be assigned to at least one of the plurality of the users and may be configured in the user-specific manner.

More information regarding optional functionality and architectural features will now be set forth for illustrative purposes. It should be noted that such various optional features each may (or may not) be incorporated with the foregoing technology of FIG. 1, per the desires of the user.

Performance of anti-virus scanning (especially scanning of files) is quite slow. When one adds the possibility of files being compressed, scanning of files becomes much slower. Various embodiments may, optionally, improve anti-virus scanning performance by keeping a MAC for files it already has scanned. When files that have been scanned traverse the network, the system may calculate the MAC and use it to determine if the file has to be scanned.

Figure 2:
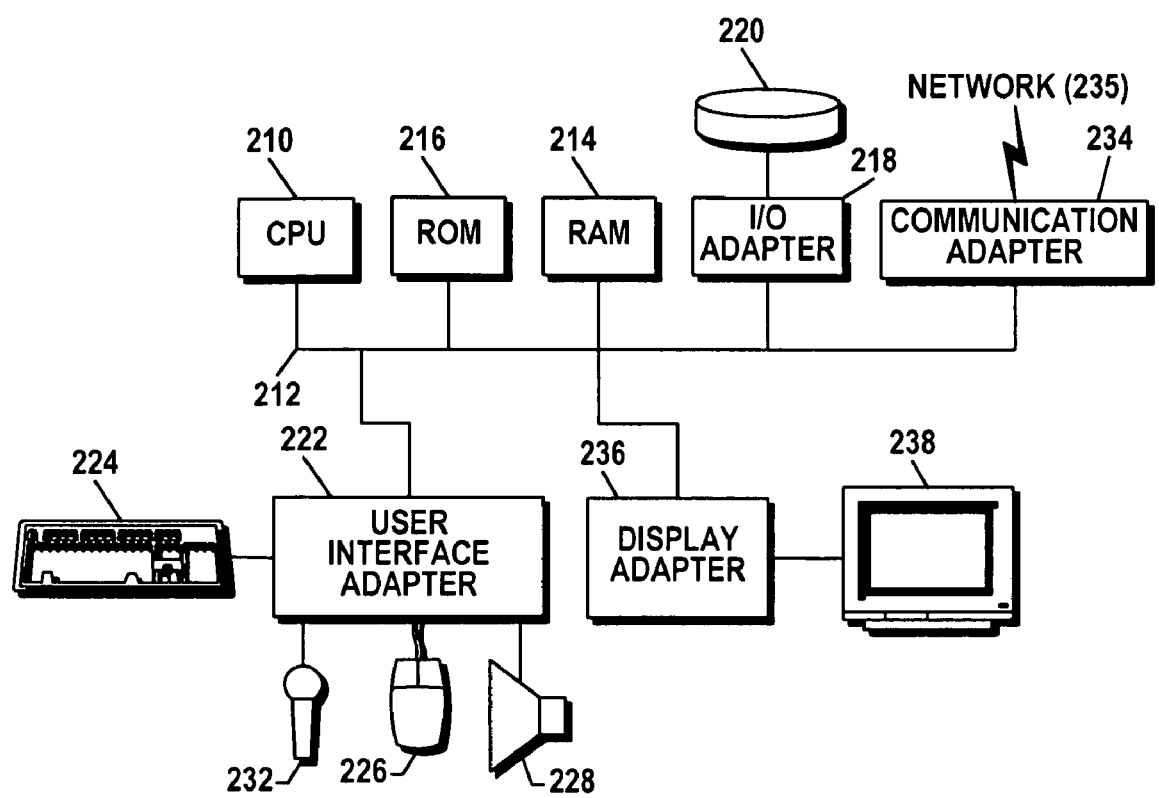
FIG. 2 shows a representative hardware environment that may be associated with the data server computers and/or end user computers of FIG. 1, in accordance with one embodiment.

FIG. 2 shows a representative hardware environment that may be associated with the data server computers 104 and/or end user computers 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object 10 oriented programming methodology. Object oriented programming (OOP) has become increasingly used to develop complex applications.

Our course, the various embodiments set forth herein may be implemented utilizing hardware, software, or any desired combination thereof. For that matter, any type of logic may be utilized which is capable of implementing the various functionality set forth herein.

Figure 3:
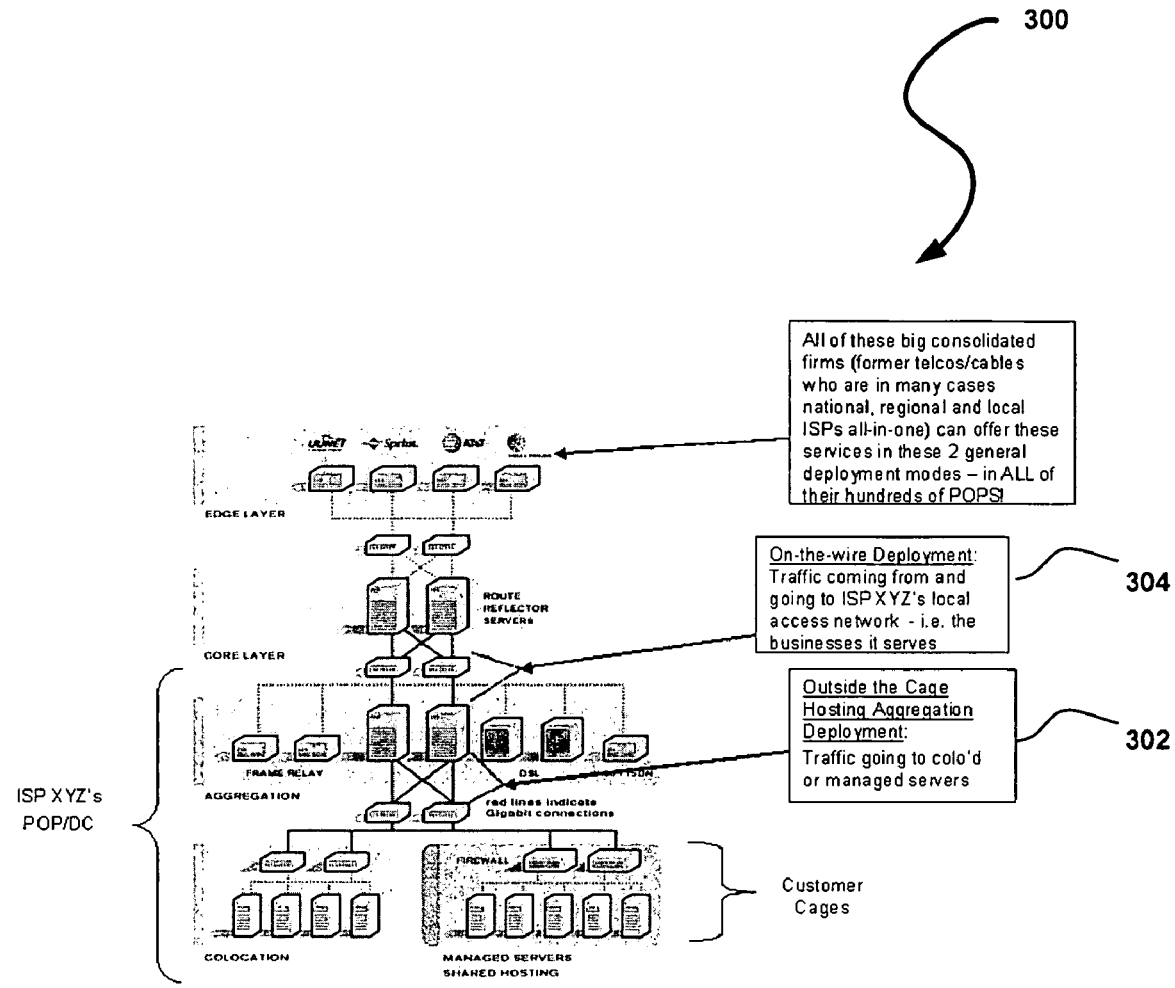
FIG. 3 illustrates a system with two exemplary service provider deployments, in accordance with one embodiment.

FIG. 3 illustrates a system 300 with two exemplary service provider deployments, in accordance with one embodiment. As an option, the present system 300 may be implemented in the context of the architecture and environment of FIGS. 1 and/or 2. Of course, however, the system 300 may be carried out in any desired environment.

In one embodiment 302, the system 300 provides functionality outside a "cage aggregation" in a hosting environment. In another embodiment 304, the system 300 provides "on-the-wire" security services (delivered by a service provider via equipment at an edge of a network).

Figure 4:
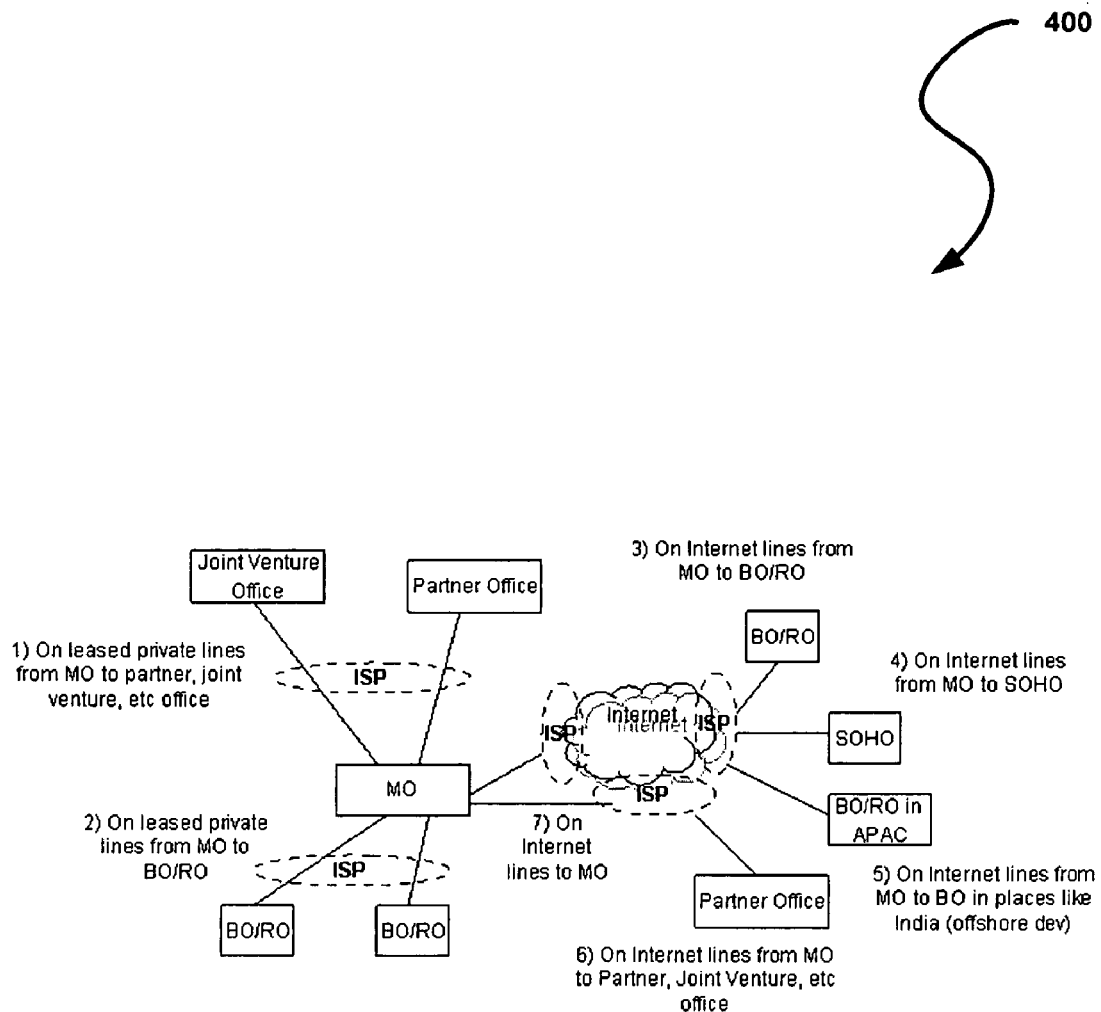
FIG. 4 shows a system that illustrates where network security services may be deployed from a functional level, in accordance with one embodiment.

FIG. 4 shows a system 400 that illustrates where network (i.e. service provider "edge," etc.) security services may be deployed from a functional level, in accordance with one embodiment. As an option, the present system 400 may be implemented in the context of the architecture and environment of FIGS. 1 and/or 2. Of course, however, the system 400 may be carried out in any desired environment.

As shown in scenarios 1)-7), the security services may be used to protect corporate customers in 7 different deployments/locations, as described. For example, the security services may be positioned on leased private lines from a main office (MO) to a partner, joint venture, etc. office. See 1). Further, the security services may be positioned on leased private lines from a main office to a back office (BO) or remote office (RO). See 2). Still yet, the security services may be positioned on Internet lines from a main office to a back office or remote office. See 3).

In a further embodiment, the security services may be positioned on Internet lines from a main office to a small office/home office (SOHO). See 4). Even still, the security services may be positioned on Internet lines from a main office to a back office such as a location offshore (i.e. India, etc.). See 5). Further, the security services may be positioned on Internet lines from a main office to a partner, joint venture, etc. office. See 6). Finally, the security services may be positioned on Internet lines to a main office. See 7).

Figure 5:
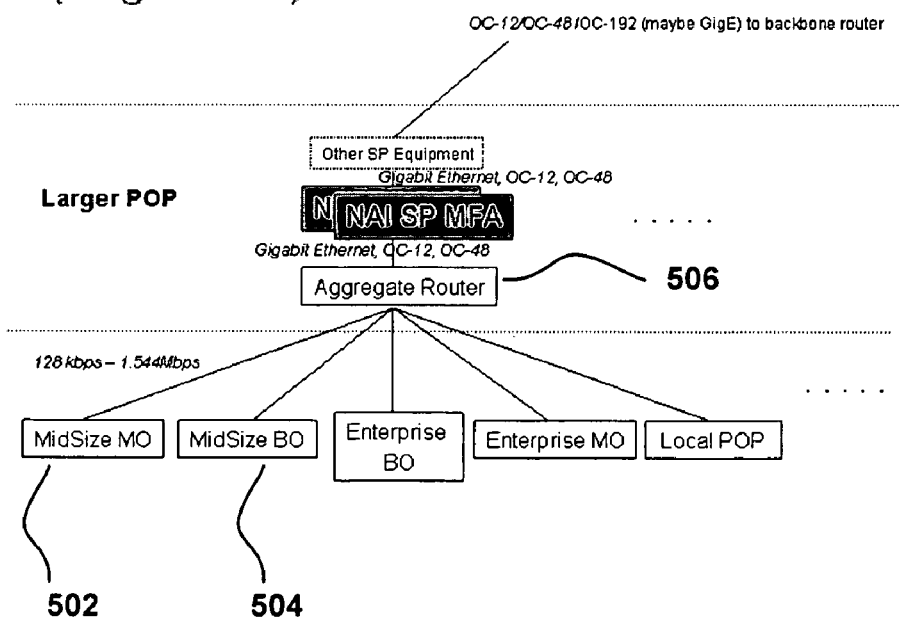
FIG. 5 illustrates a system involving one possible on-the-wire deployment model, in accordance with one embodiment.

FIG. 5 illustrates a system 500 involving one possible on-the-wire deployment model, in accordance with one embodiment. As an option, the present system 500 may be implemented in the context of the architecture and environment of FIGS. 1 and/or 2. Of course, however, the system 500 may be carried out in any desired environment.

With reference to FIG. 5, a mid-size business main office 502 and branch office 504 are possible locations for the aforementioned security services provided by a service provider. It should be noted that, in this model, it may be assumed that an aggregate router 506 resides in front and adds virtual local area network (VLAN) tags.

In various embodiments, the aforementioned VLAN tags may be stripped by the security services and/or router. Further, static routing, or even open-shortest-path-first (OSPF) techniques, may be used. Also, support may be provided for both a transparent and routing mode. This may even be implemented on a per-port basis to allow configuration for customers of a service provider.

The present embodiment may further act as a Dynamic Host Configuration Protocol (DHCP) server for an internal network with the following parameters of Table 1 configurable by the user and/or per domain.

TABLE 1

Range of IP Addresses To Assign
Network Mask To Assign
Renewal Time (in seconds): This specifies how often the clients have to get a new DHCP address
Optional (user could just leave blank): Domain To Assign
Optional (user could just leave blank): IP addresses of DNS Servers To Assign

TABLE 1-continued

Optional (user could just leave blank): Any static routes to assign
Optional (user could just leave blank): Windows Internet Name
Service (WINS) Server IP addresses As an option, the present embodiment may further support IPv6.

Figure 6:
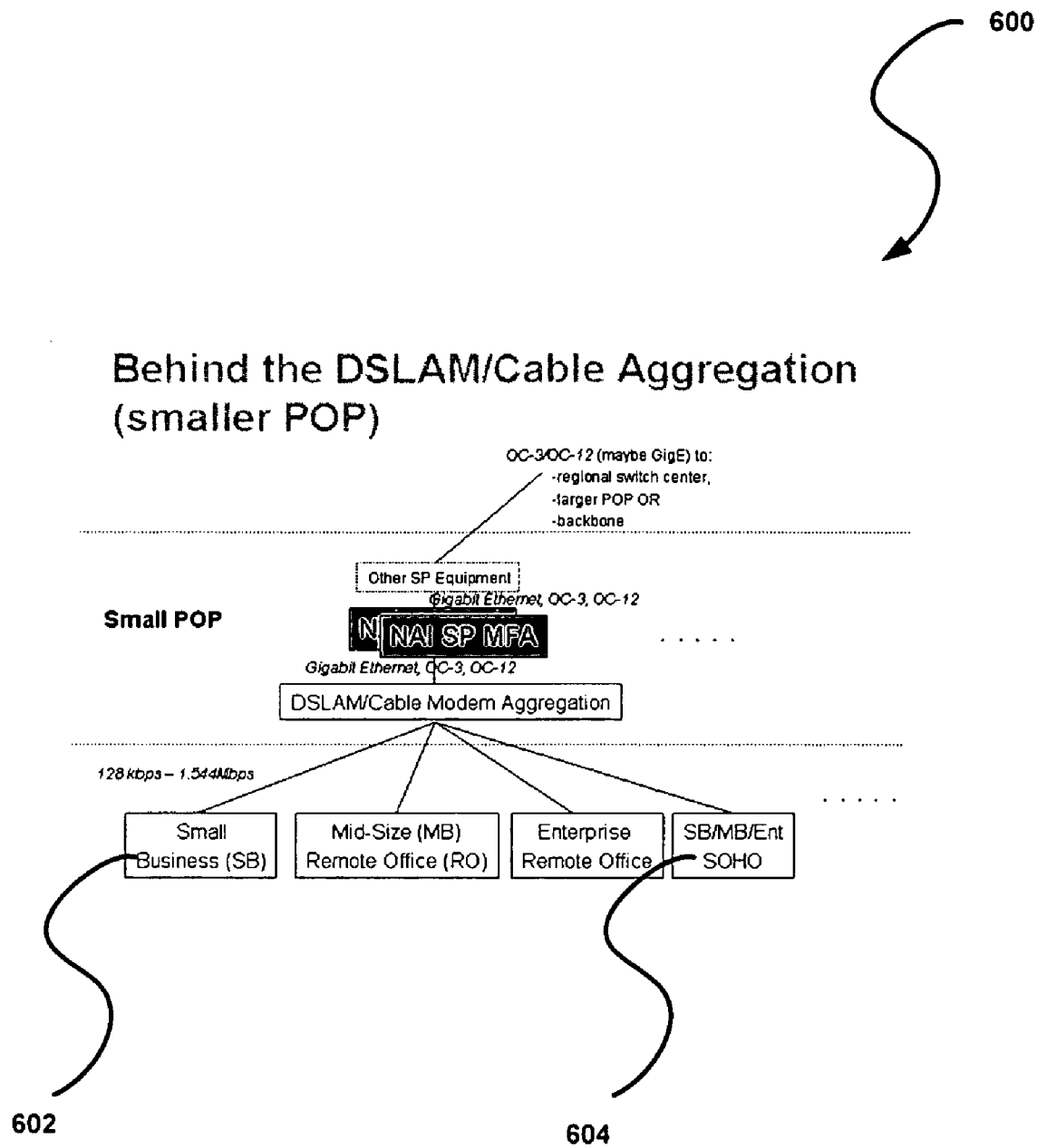
FIG. 6 illustrates a system involving an example of a deployment for a smaller point-of-service (POP), in accordance with one embodiment.

FIG. 6 illustrates a system 600 involving an example of a deployment for a smaller point-of-service (POP), in accordance with one embodiment. As an option, the present system 600 may be implemented in the context of the architecture and environment of FIGS. 1 and/or 2. Of course, however, the system 600 may be carried out in any desired environment. As shown, the current system 600 aggregates very low bandwidth lines from small business environments 602, and small office/home office environments 604.

Figure 7:
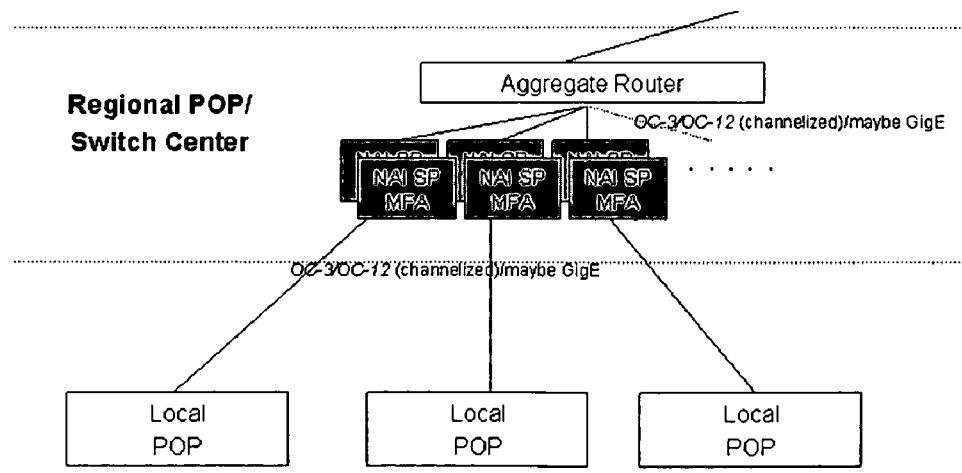
FIG. 7 illustrates a system involving another example of a deployment for a larger point-of-service (POP), in accordance with one embodiment.

FIG. 7 illustrates a system 700 involving another example of a deployment for a smaller point-of-service (POP), in accordance with one embodiment. As an option, the present system 700 may be implemented in the context of the architecture and environment of FIGS. 1 and/or 2. Of course, however, the system 700 may be carried out in any desired environment. The present deployment may be possible with use of OCX Packet-over-SONET I/O cards. Of course, any desired type of deployment is possible.

Figure 8:
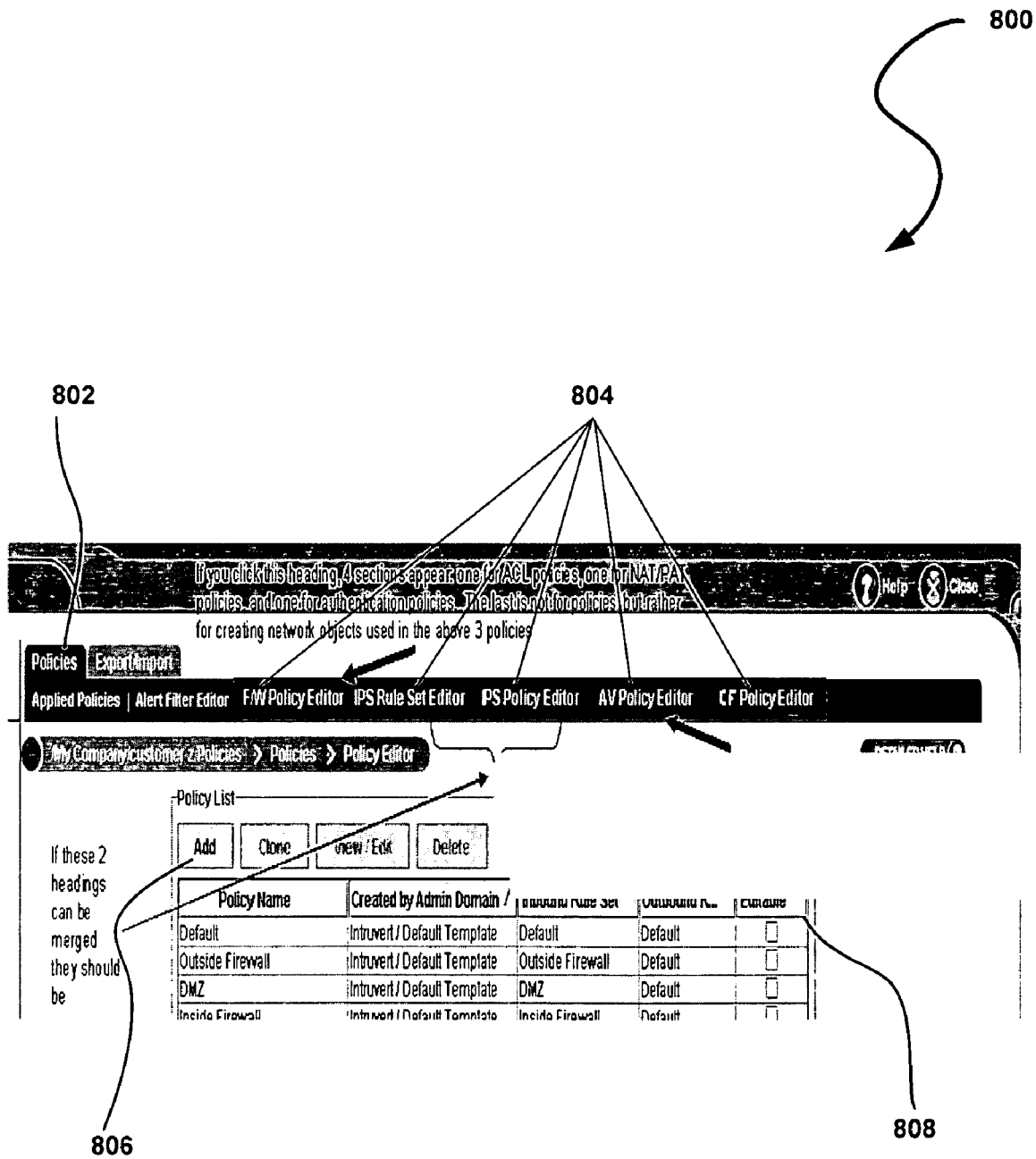
FIG. 8 illustrates one possible graphical user interface capable of being used for policy management, in accordance with one embodiment.

FIG. 8 illustrates one possible graphical user interface 800 capable of being used for policy management, in accordance with one embodiment. As an option, the present graphical user interface 800 may be implemented in the context of the architecture and environment of FIGS. 1 and/or 2. Of course, however, the graphical user interface 800 may be carried out in any desired environment.

In use, policies may be created for the various aforementioned security functions and may be set (and provisioned in a service provider and/or enterprise embodiment, for example) for specific domains, customers, etc. It may be noted that the graphical user interface 800 (and related user interfaces to be set forth hereinafter) are merely illustrative, and should not be considered limiting in any manner.

Using a "Policies" tab 802, various policies may be created. Depending on what types of functionality (i.e. firewalls, IPSs, virus scanners, etc.) are enabled, the related headings 804 may be optionally "grayed out" to indicate that the functionality is either not activated by a particular user or not subscribed to the user.

By selecting the different headings 804, a user may select/edit policies to control the different security functionality. For example, as shown in FIG. 8, options 806 such as adding, cloning, viewing/editing, and deleting policies are provided. Further, a table 808 may be provided for displaying policy names, identifying a source of each policy, displaying an inbound rule set, displaying an outbound rule set, displaying an editable function, etc.

In the context of a firewall policy editor interface, there may be a plurality of sections, including sections for creating different types of policies and at least one section for creating firewall objects (i.e. network objects, service objects and time objects, etc.).

Figure 9:
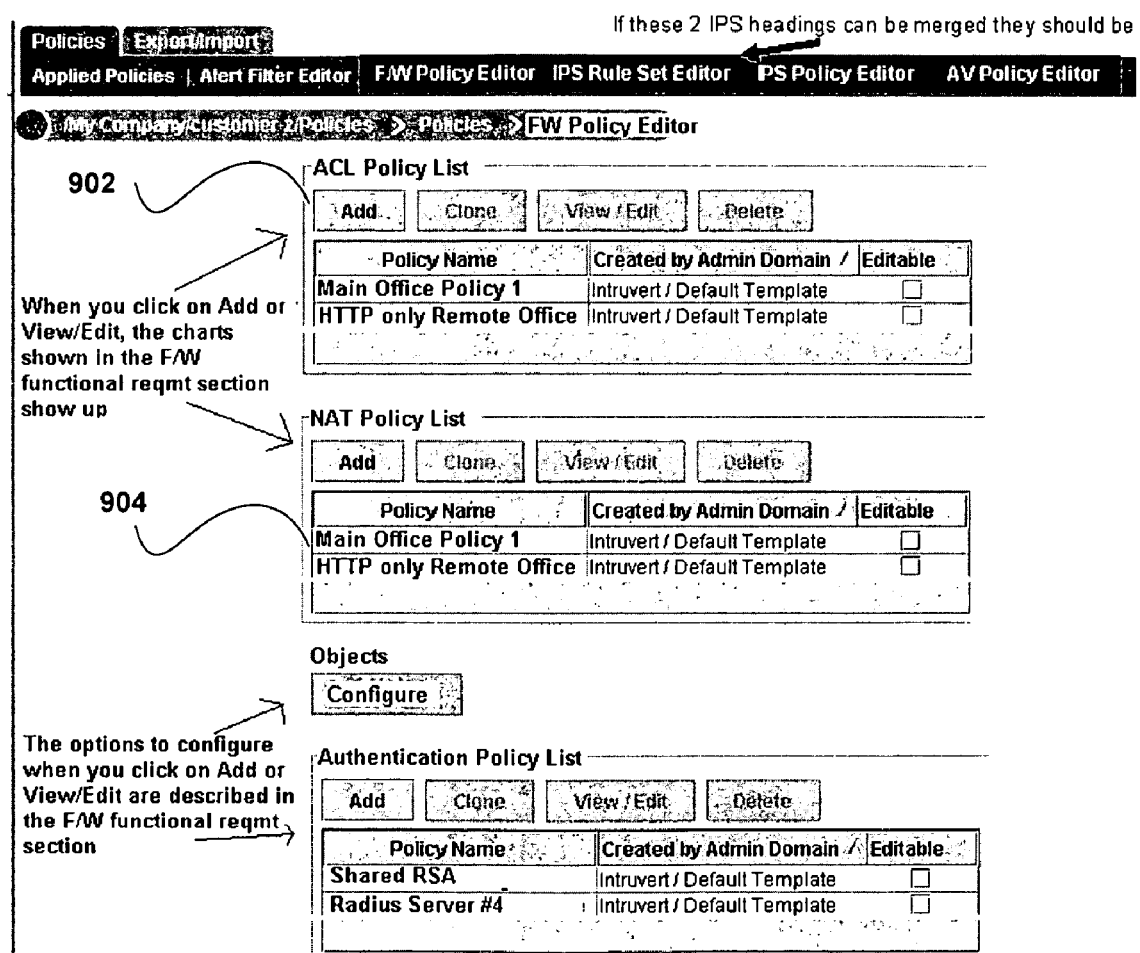
FIG. 9 illustrates one possible graphical user interface capable of being used for firewall policy management, in accordance with one embodiment.

FIG. 9 illustrates one possible graphical user interface 900 capable of being used for firewall policy management, in accordance with one embodiment. As an option, the present graphical user interface 900 may be implemented in the context of the architecture and environment of FIGS. 1 and/or 2. Of course, however, the graphical user interface 900 may be carried out in any desired environment.

Similar to the interface of FIG. 8, options 902 such as adding, cloning, viewing/editing, and deleting policies are provided. Further, a table 904 may be provided for displaying policy names, identifying a source of each policy, displaying an editable function, etc.

For a specific function configuration to appear in the various user interfaces, it may, in one embodiment, be required to be provisioned by a reseller or the like. For example, a reseller may only want intrusion prevention system (IPS) services to be provisioned to 2 of 4 subscribers (who signed up and paid for such service). This provisioning of services and constraints may be carried out utilizing a reseller user interface, separate from the subscriber user interface.

As an option, a provisioning section of a user interface may be displayed only if a higher-level domain (i.e. higher in a hierarchical tree, etc.) has enabled an "allow child provisioning" option. In other words, the aforementioned provisioning section may only be displayed in a specific domain if the original function is activated, and the function is provisioned to the domain (and, of course, the "allow child provisioning" option is selected).

Figure 10:
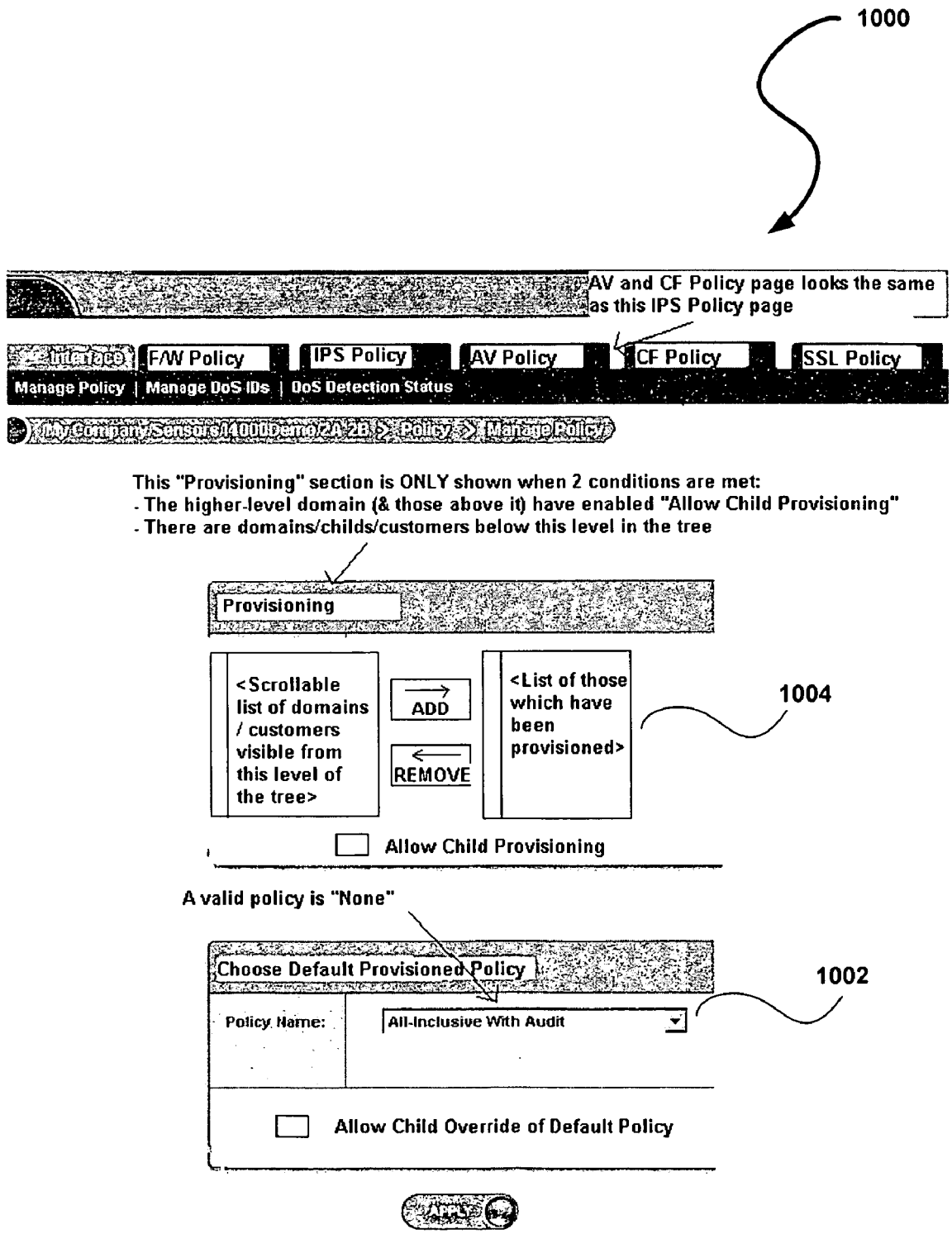
FIG. 10 illustrates one possible graphical user interface for policy management, in accordance with one embodiment.

FIG. 10 illustrates one possible graphical user interface 1000 for policy management, in accordance with one embodiment. As an option, the present graphical user interface 1000 may be implemented in the context of the architecture and environment of FIGS. 1 and/or 2. Of course, however, the graphical user interface 1000 may be carried out in any desired environment.

As shown, a default policy that is to be provisioned may be chosen via a pull-down menu 1002 or the like. Further, a list of policies created via a "policies" section (see previous figures) may be shown and provisioned using a two-window selection menu 1004.

Figure 11:
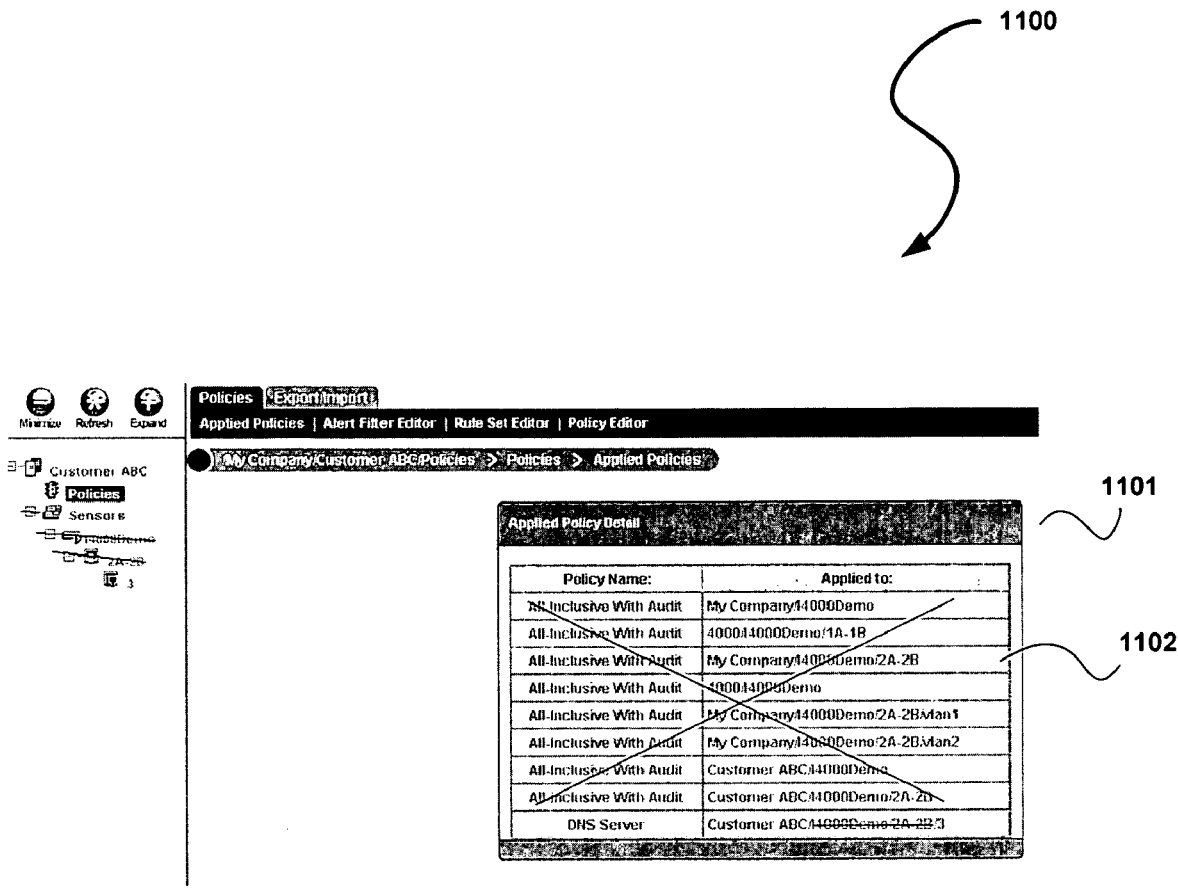
FIG. 11 illustrates one possible graphical user interface for providing details on applied policies, in accordance with one embodiment.

FIG. 11 illustrates one possible graphical user interface 1100 for providing details on applied policies, in accordance with one embodiment. As an option, the present graphical user interface 1100 may be implemented in the context of the architecture and environment of FIGS. 1 and/or 2. Of course, however, the graphical user interface 1100 may be carried out in any desired environment.

In one embodiment, an administrator of subscribers many need to login to the present embodiment to see a pertinent configuration, view logs, create users who can log in, etc. The present graphical user interface 1100 is what may be referred to as a "subscriber portal." The present graphical user interface 1100 ensures that a customer logging in does not see upper domain information (if he/she is not permitted).

As shown in FIG. 11, an "applied policy detail" window 1101 is provided. In one embodiment, a user does not see any details on policies applied above his/her domain. For example, in FIG. 11, an end customer called Customer ABC is shown to be logged in. Note that the information "crossed-out" 1102 should not be shown since it relates to higher level or parallel domain information. Further, the "Sensor" section has been shown since this is how the user can "update" the sensor when he/she makes changes (if they have permission to do that, of course). Hence, it is not crossed-out.

Figure 12:
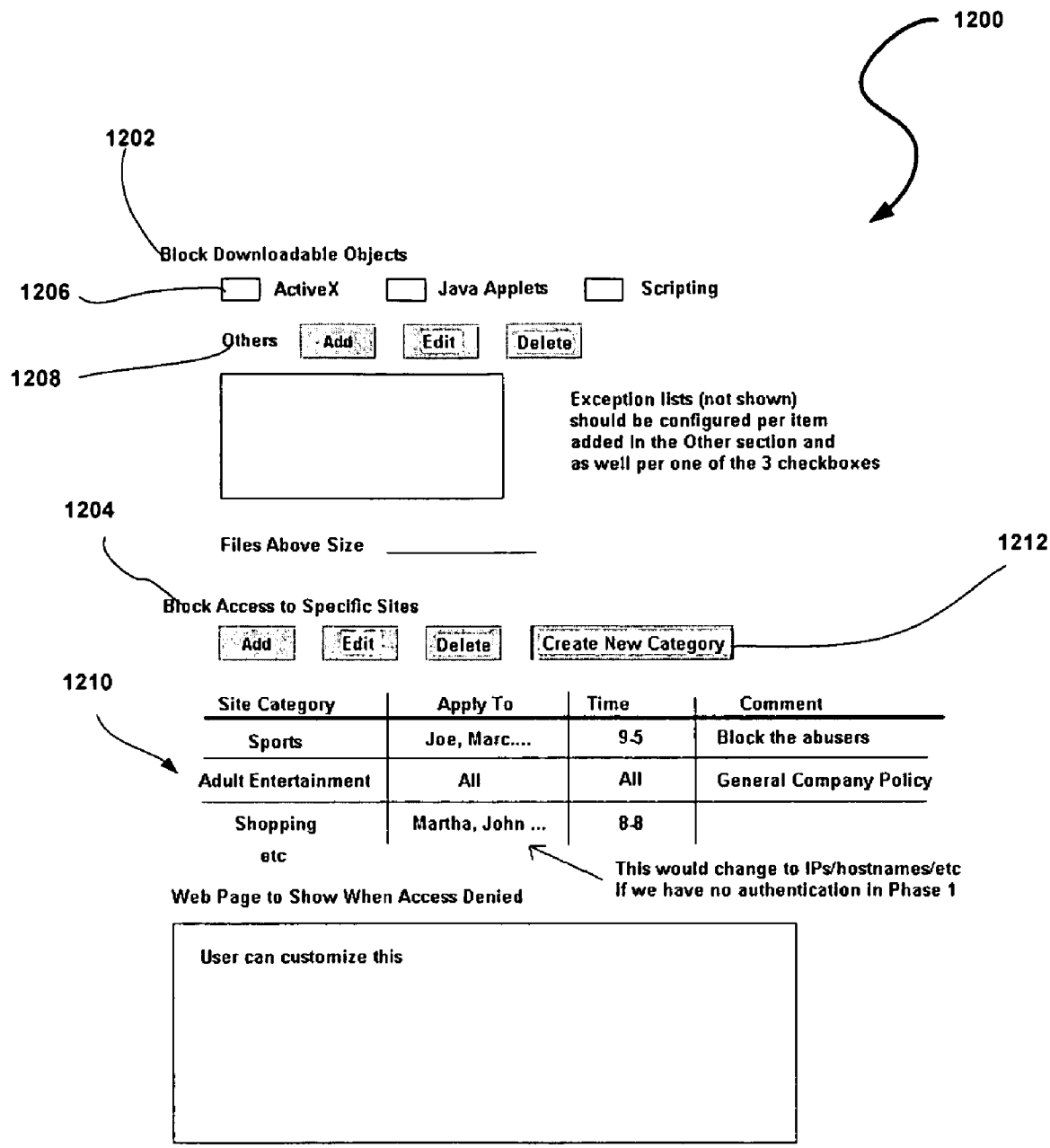
FIGS. 12-13 illustrate possible graphical user interfaces for providing content/uniform resource locator (URL) filtering, in accordance with one embodiment.

FIG. 12 illustrates one possible graphical user interface 1200 for providing content/uniform resource locator (URL) filtering, in accordance with one embodiment. As an option, the present graphical user interface 1200 may be implemented in the context of the architecture and environment of FIGS. 1 and/or 2. Of course, however, the graphical user interface 1200 may be carried out in any desired environment.

In one embodiment, the aforementioned filtering may include the ability to block ActiveX components, Java applets, and/or scripting languages. In yet another embodiment, an ability may be provided for allowing a user to block a specific regular expression-based URL and, if possible, some body content. Further, a feature may be provided for including pre-created profiles to block categories of content.

The foregoing functionality may be implemented on a "per user" basis in a domain, by linking to an authentication and user paradigm. As an option, there may be exception lists with which one may specify a list of source and/or destination IPs/hostnames/domain names, etc.

As shown in FIG. 12, the graphical user interface 1200 may include a block downloadable objects section 1202 and a block access to specific sites section 1204.

The block downloadable objects section 1202 is shown to include a plurality of selection icons 1206 for selecting to remove ActiveX, scripting, etc. from a page that is passed through. A user can further add more items to block by configuring a regular expression, and even block files above a certain user-configured size, as shown. There is further an others input window 1208 (and associated add, edit, and delete options) for providing exception lists. For items in such others input window 1208, there is no removal of links to the other object, but rather just blockage of the actual download of the object when there is a click on an associated link.

The block access to specific sites section 1204 similarly includes associated add, edit, and delete options, and an associated table 1210 for listing different site categories, to whom they apply, a time when they apply, and a comment. There is also an input for allowing a user to choose a web page to show when an access request is denied.

Figure 13:
Figure 13:

When a create new category option 1212 is selected, the graphical user interface 1300 shown in FIG. 13 is displayed. As shown, the graphical user interface 1300 allows the user to configure regular expressions (in the URL) that are to be blocked. It should be noted that a database may be provided so that the user may simply select a category whereby all the websites that fall into such category would automatically be taken from the database and applied. This may save the user from having to enter in the numerous regular expressions.

As an option, access attempts may also be logged in a content filtering log with a username (or IP, hostname, etc.) so that an administrator can use a report generator to show the attempted accesses by a specific employee of restricted web sites or content.

Further, each subscriber may be able to produce a log specific to activities, etc. of the subscriber. For example, some customers of a service provider may need to see specific firewall, virus scanner, intrusion prevention system (IPS), or content filtering logs. In one embodiment, the format of the log may be a customizable log format.

Enforcing subscriber constraint requirements may be accomplished in any desired manner. Customers, in one embodiment, may be given numerous controls to ensure a few subscribers do not monopolize the present system inappropriately. For example, the following parameters of Table 2 may be optionally configured by each subscriber, or per any higher level domain (i.e. someone may want to enforce this on one interface group, or on one interface, etc).

TABLE 2

Maximum Number of ACL Entries
Maximum Number of NAT/PAT Entries
Maximum Number of Routes
Maximum Number of TCP flows at one time
Maximum Number of Content Filtering Rules
Maximum Number of Sub-Admin Domains that can be created
Maximum Number of SSL Keys TABLE 2-continued What Type of Reports they Can Generate, Maximum Number of Times they Can Schedule Reports, & How Many They Can Schedule (and optionally even time constraints on when they can)

Figure 14:
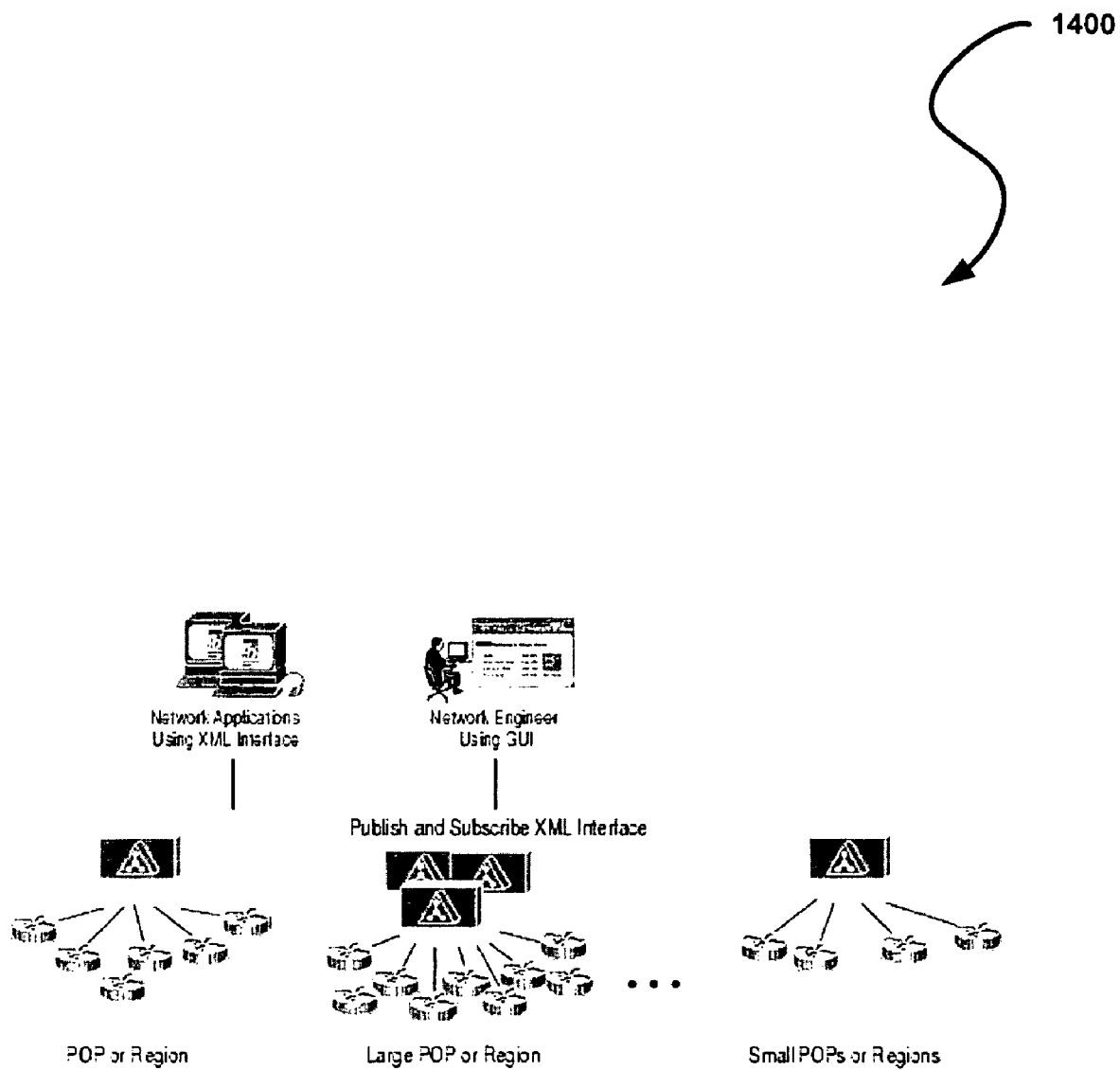
FIG. 14 illustrates a system for implementing service provider management hooks, in accordance with one embodiment.

FIG. 14 illustrates a system 1400 for implementing service provider management hooks, in accordance with one embodiment. As an option, the present system 1400 may be implemented in the context of the architecture and environment of FIGS. 1 and/or 2. Of course, however, the system 1400 may be carried out in any desired environment.

Optionally, the security services may be managed by a standalone management console or using another management interface or tool. As shown in FIG. 14, a dual environment is set forth which may be supported.

Table 3 sets forth two management systems to which service providers may need to connect.

TABLE 3

Operations Support Systems (OSS)/Billing Support Systems (BSS): An OSS system may be used to support operational issues such as account activation, provisioning, service assurance, and usage/metering. A BSS system may be used for billing including invoicing, rating, taxation, collections, and customer management including order entry, customer self services, customer care, trouble ticketing, and customer relationship management.
Network Management Systems (NMS): These may be used for tracking performance, updating software, etc.

Thus, an interface may be provided which allows service providers to integrate the present security services product into the foregoing systems. Some additional optional features are set forth in Table 4.

TABLE 4

The interface may be able to issue commands and collect information at the domain level (i.e. one can set policies and provision for a whole domain or just one device, or just one VLAN of a device, etc via a command.
Each security function (i.e. HTTP virus scanner, firewall, IPS, HTTP content filtering, etc) may have a published set of APIs (if needed) for allowing one to add APIs as new functions are added or if there is a need to revise (maintaining backward compatibility) the APIs.

Figure 15:
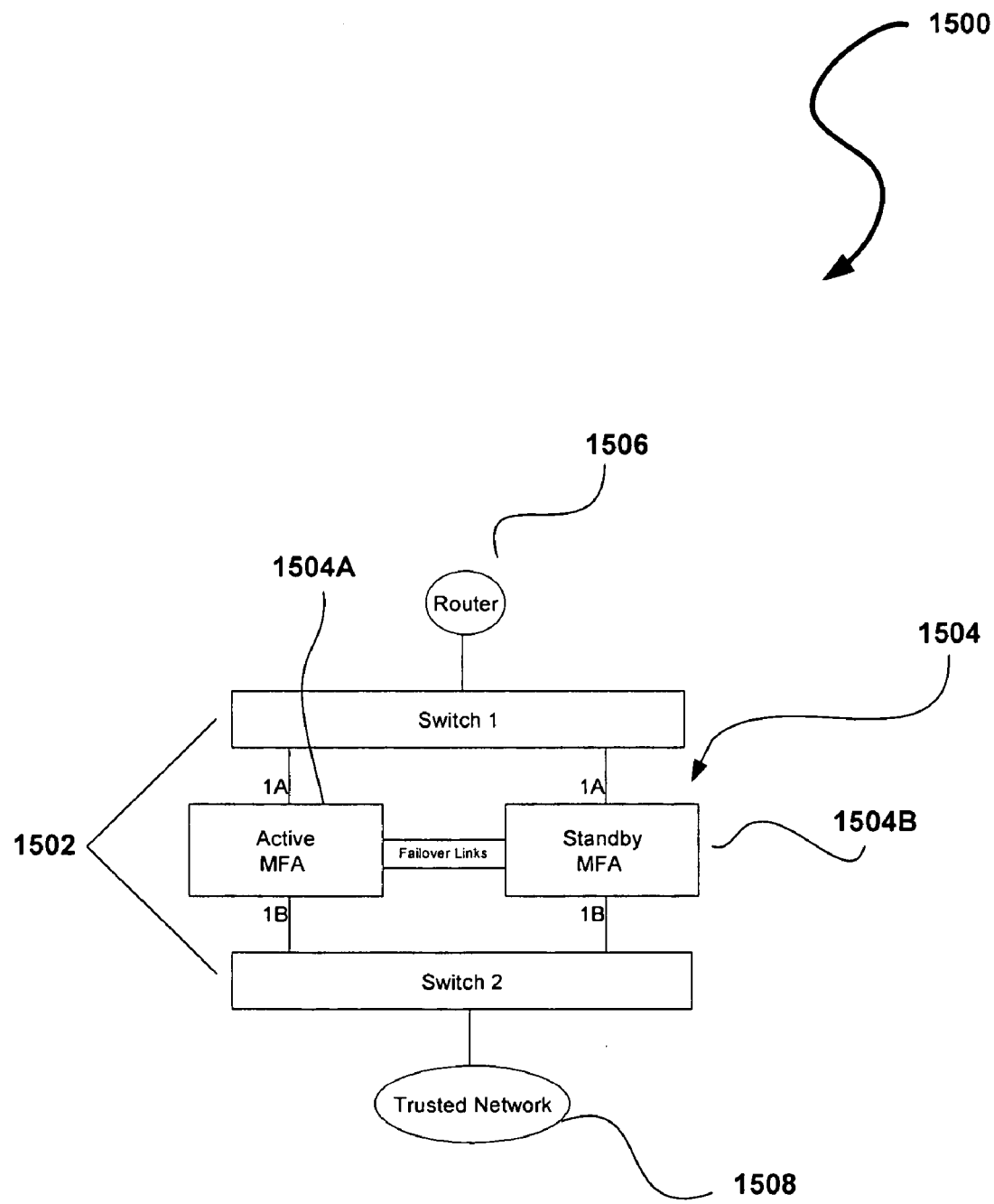
FIGS. 15-16 illustrate systems for providing an optional failover feature.
Figure 16:
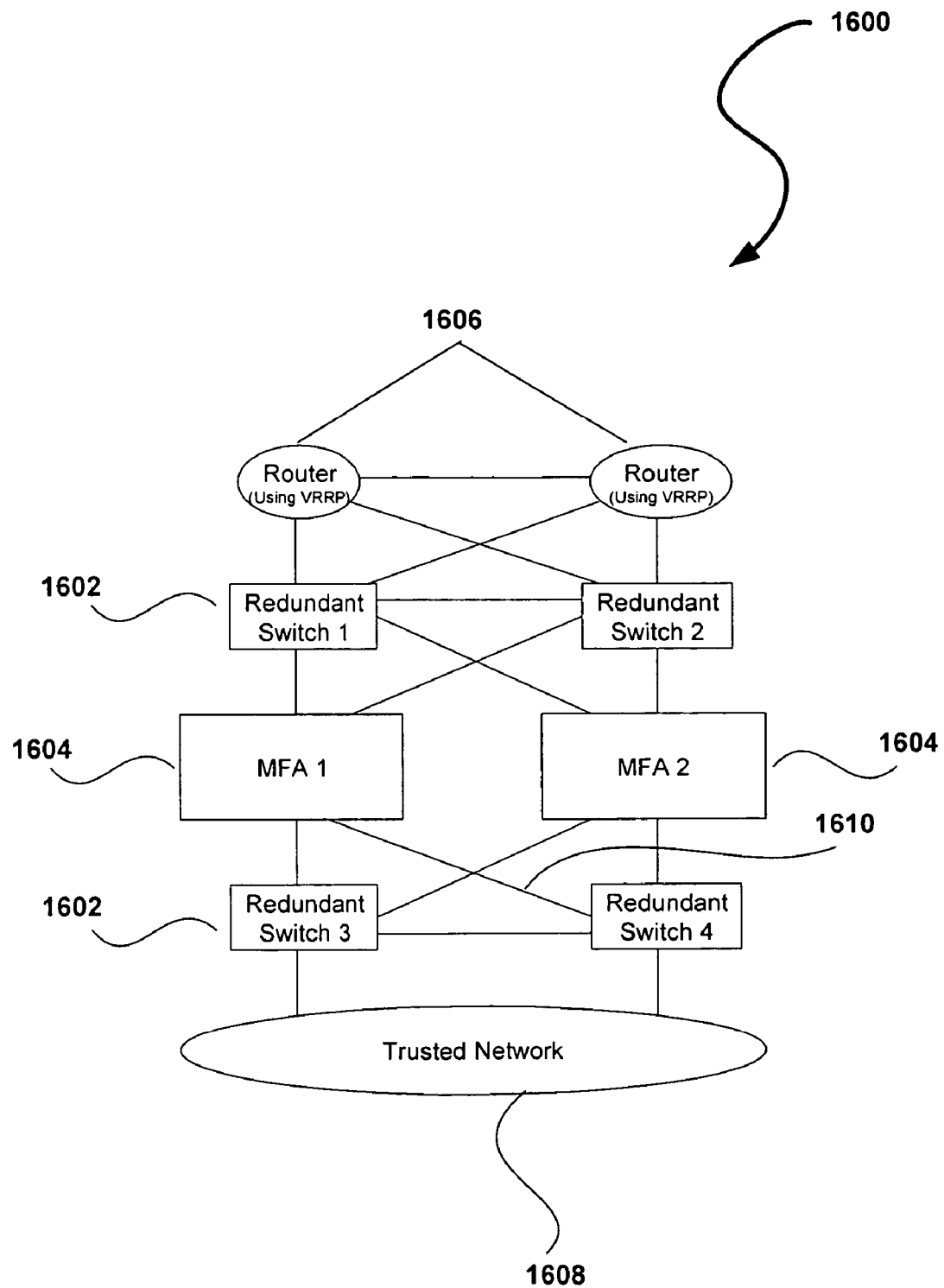

FIGS. 15-16 illustrate systems 1500-1600 for providing a failover feature. As an option, the present systems 1500-1600 may be implemented in the context of the architecture and environment of FIGS. 1 and/or 2. Of course, however, the systems 1500-1600 may be carried out in any desired environment.

The mechanism for supporting a failover feature may be different in routing mode and transparent mode. In the present embodiment, the failover feature may allow a customer to minimize downtime due to sensor malfunction or upgrade by using a pair of sensors instead of one. Typically, in routing mode, one of the sensors may be active at any point of time while the other is in a standby mode ready to take over traffic handling should the active sensor fail for any reason.

In transparent mode, both the sensors may be active and both the sensors may process traffic in an asymmetric way. In addition, the same functionality may be supported by using two cards in a single chassis.

In routing mode, one card or set of ports on one card may be active and a set of ports on another card may be in standby mode. To support failover, both sensors or both cards in a chassis may exchange state information to ensure existing active flows on the failed system may be processed on the now active system. The following description may apply to routing mode operation.

FIG. 15 shows a pair of switches 1502 coupling a pair of parallel security systems 1504 (an active security system 1504A and a standby security system 1504B) between a router 1506 and a network 1508, in an active/standby configuration.

The active and standby security systems 1504 provide alternate network paths for packets to flow between networks connected by the security systems 1504. When one security system 1504 fails, packets may be routed through the other security system 1504, and vice versa.

For high bandwidth scenarios, the system 1600 of FIG. 16 may be provided with a "full mesh" configuration. As shown, a set of redundant switches 1602 couple a pair of parallel security systems 1604 between virtual redundancy router protocol (VRRP) routers 1606 and a network 1608.

As shown, there are multiple redundant paths 1610. Traffic outage is caused only when both the active and standby security systems 1604 of a given type (i.e. switch, security system, router, etc.) fail. This configuration requires support for interface failover in addition to device failover.

Each security system 1604 uses two interfaces (i.e. an active and standby interface) for processing traffic from the network 1608. Only one of the two interfaces connected to the network 1608 is operationally up (i.e. active) at any time. When the active interface goes down for a period of time, the backup interface is brought up to process traffic. When both interfaces connected to a network fail, traffic on that interface and related interfaces is switched over to the standby security system, as described earlier.

In one example of use of the failover feature, two security systems are paired as failover peers and enabled for failover. Such security systems then negotiate the active/standby status for each associated physical port. At the end of this negotiation, one security system becomes the active security system for all physical ports and the other becomes the standby for all physical ports. Both the standby interfaces and the active interfaces are always operationally up. The standby sensor may, however, drop all packets received on the standby ports.

At any time, traffic is received by the active security system which performs the necessary processing. Any packets received by the standby security system on associated monitoring ports are dropped. The standby and the active security systems exchange information to ensure that the associated peer is still running. Such information includes an active/standby status per port. If both security systems inform the other that it is active for a port, the security systems may renegotiate the respective status, as set forth hereinabove.

The active security system continually monitors interface failure, hardware/software failure, and network failure on all interfaces. When any of the failures are detected, the active security system attempts to assume standby status for the failed ports (and related ports). The standby security system may not monitor failover conditions.

Traffic switchover from active to standby may be initiated either by the security system or by an external device. At any time, the active security system may request the standby security system to take over as the active security system for any subset of interfaces. As an option, the standby security system may perform a set of tests to determine if it is capable of taking over as the active security system. These tests may be performed on a per-interface basis. Table 5 sets forth some exemplary tests.

TABLE 5

Network interface card (NIC) test: Check if the interface to be made active is up.
Address resolution protocol (ARP) test: Typically the system ARP cache is read for the 10 most recently acquired entries. Then ARP requests are sent to those machines to generate network traffic. If a non-zero number of packets are received on the interface within 5 seconds, the interface is assumed to be operational.
Ping test: The system sends out a broadcast ping request and then counts all received packets for 5 seconds. If any packets are received, the interface is considered good.

The following sequence of events of Table 6 may take place when active to standby switchover is initiated by the active security system for a particular interface:

TABLE 6

1. The active security system determines that an interface has failed.
2. The active security system requests the standby security system to assume the active role for the interface.
3. The standby security system issues ARP requests to the set of configured IP addresses on the interface.
4. The standby security system verifies if it received a reply from each of the IP addresses within the configured timeout. If so, it communicates the information using the failover protocol. The active and the standby security system switch roles.
5. The standby (now active) security system issues gratuitous ARP requests for all IP addresses configured on the port. A gratuitous ARP occurs when a host sends an ARP request looking for its own IP address. The ARP protocol (RFC 826) requires that if a host receives an ARP request from an IP address that is already in the receiver cache, then such cache entry is updated with the sender Ethernet address from the ARP request. The gratuitous ARPs therefore update the ARP caches of routers and hosts adjacent to the security system. Gratuitous ARPs are issued for all ports by the active security system at initialization.
6. If the standby determines it is unfit for assuming the active role in Step 4, it informs the active security system of this failure. The active security system then issues gratuitous ARPs for all IP addresses configured on the port. The active security system continues to be the active security system for that port.

Traffic switched over by an external device can trigger a switchover by the security system. Thus, if a router connected to the active security system switched over the traffic to the standby security system, it signals the active security system either by bringing down an interface or by not responding to the ARP requests. If a switchover happened farther than the immediate device connected to the security system, the active security system may determine that the network path has failed and initiate switchover of the interface to the standby security system.

In one embodiment, terrorism may be countered utilizing the aforementioned technology. According to the U.S. Federal Bureau of Investigation, cyber-terrorism is any "premeditated, politically motivated attack against information, computer systems, computer programs, and data which results in violence against non-combatant targets by subnational groups or clandestine agents." A cyber-terrorist attack is designed to cause physical violence or extreme financial harm. According to the U.S. Commission of Critical Infrastructure Protection, possible cyber-terrorist targets include the banking industry, military installations, power plants, air traffic control centers, and water systems. Thus, by optionally incorporating the present technology into the cyber-frameworks of the foregoing potential targets, terrorism may be countered by preventing the infection thereof with malware, which may potentially cause extreme financial harm.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A security system, comprising:
a router; and
a security sub-system coupled to the router;
wherein the security sub-system includes a plurality of virtual firewalls, a plurality of virtual intrusion prevention systems (IPSs), and a plurality of virtual virus scanners all integrated into a single sub-system,
wherein each of the virtual firewalls, IPSs, and virus scanners is assigned to at least one of a plurality of users and is configured in a user-specific manner;
wherein the user-specific configuration is provided utilizing a plurality of user-specific policies selected utilizing at least one graphical user interface such that a first user of the single sub-system is capable of selecting a first policy utilizing a first graphical user interface of the single sub-system and a second user of the single sub-system is capable of selecting a second policy utilizing a second graphical user interface of the single sub-system.

2. The system as recited in claim 1, wherein the security sub-system further includes a plurality of anti-spam modules and each of the anti-spam modules is assigned to at least one of the plurality of the users and is configured in the user-specific manner.

3. The system as recited in claim 1, wherein the security sub-system further includes a plurality of content filtering modules and each of the content filtering modules is assigned to at least one of the plurality of the users and is configured in the user-specific manner.

4. The system as recited in claim 1, wherein the security sub-system further includes a plurality of uniform resource locator (URL) filtering modules and each of the URL filtering modules is assigned to at least one of the plurality of the users and is configured in the user-specific manner.

5. The system as recited in claim 1, wherein the security sub-system further includes a plurality of virtual private network (VPN) modules and each of the VPN modules is assigned to at least one of the plurality of the users and is configured in the user-specific manner.

6. The system as recited in claim 1, wherein the security sub-system further includes a plurality of spyware filtering modules and each of the spyware filtering modules is assigned to at least one of the plurality of the users and is configured in the user-specific manner.

7. The system as recited in claim 1, wherein the security sub-system further includes a plurality of adware filtering modules and each of the adware filtering modules is assigned to at least one of the plurality of the users and is configured in the user-specific manner.

8. The system as recited in claim 1, wherein the user-specific policies are selected by each user.

9. The system as recited in claim 1, wherein the graphical user interface includes a virtual firewall interface, a virtual IPS interface, and a virtual virus scanner interface.

10. The system as recited in claim 1, wherein the security sub-system resides in front of the router.

11. The system as recited in claim 1, wherein the security sub-system resides in back of the router.

12. The system as recited in claim 1, wherein the security sub-system is a component of the router.

13. The system as recited in claim 1, wherein the system is used to counter terrorism.

14. The system as recited in claim 1, wherein the security sub-system is equipped with a failover function.

15. The system as recited in claim 1, wherein each of the graphical user interfaces only allows selection of policies with respect to predetermined security functionalities that are subscribed to by the user.

16. the system as recited in claim 15, wherein the predetermined security functionalities are selected utilizing an interface separate from the first graphical user interface and the second graphical user interface 17. A security method, comprising:
receiving data utilizing a router; and
processing the data utilizing a security system coupled to the router;
wherein the security system includes a plurality of virtual firewalls, a plurality of virtual intrusion prevention systems (IPSs), and a plurality of virtual virus scanners all integrated into a single system,
wherein each of the virtual firewalls, IPSs, and virus scanners is assigned to at least one of a plurality of users and is configured in a user-specific manner;
wherein the user-specific configuration is provided utilizing a plurality of user-specific policies selected utilizing at least one graphical user interface such that a first user of the single system is capable of selecting a first policy utilizing a first graphical user interface of the single system and a second user of the single system is capable of selecting a second policy utilizing a second graphical user interface of the single system.

18. A security computer program product embodied on a computer readable medium, comprising:
computer code for receiving data utilizing a router; and
computer code for processing the data utilizing a security system coupled to the router;
wherein the security system includes a plurality of virtual firewalls, a plurality of virtual intrusion prevention systems (IPSs), and a plurality of virtual virus scanners all integrated into a single system,
wherein each of the virtual firewalls, IPSs, and virus scanners is assigned to at least one of a plurality of users and is configured in a user-specific manner;
wherein the user-specific configuration is provided utilizing a plurality of user-specific policies selected utilizing at least one graphical user interface such that a first user of the single system is capable of selecting a first policy utilizing a first graphical user interface of the single system and a second user of the single system is capable of selecting a second policy utilizing a second graphical user interface of the single system.

* * * * *